Patented Mar. 16, 1937

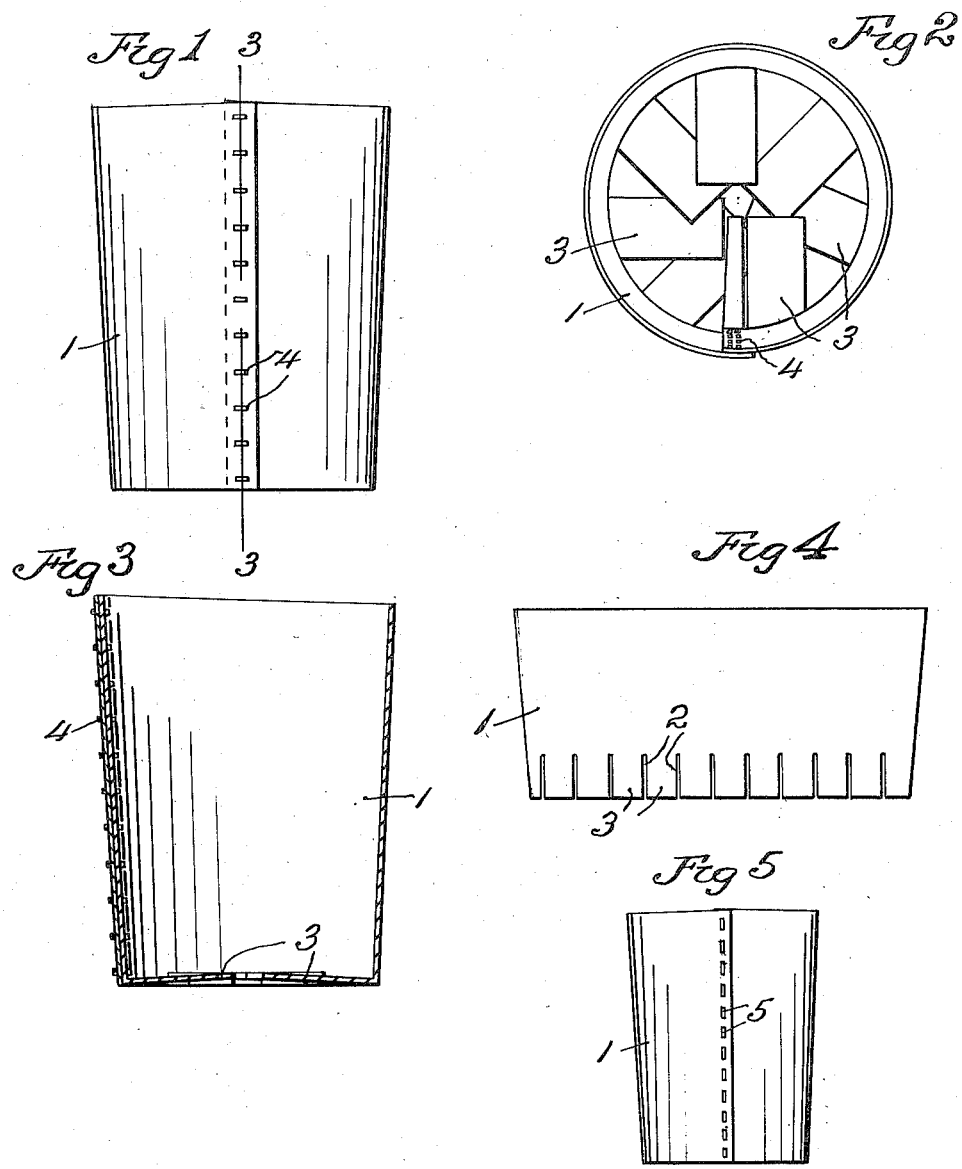

2,073,695

UNITED STATES PATENT OFFICE 2,073,695

FLOWERPOT AND METHOD OF MAKING SAME

Kenneth Haysler and Ernest Haysler, Kansas City, Mo.

Application September 26, 1935, Serial No. 42,309

1 Claim. (Cl. 93—36.8)

Our invention relates to improvements in flower pots and methods of making same.

It relates particularly to a flower pot which is adapted for use as a temporary receptacle for a plant which is to be transplanted.

One of the objects of our invention is to provide a novel method of making a flower pot of the kind described, which flower pot will be cheap, strong, durable, light, portable, easily made without special tools, and in which plants may be safely temporarily planted and later transported to their permanent locations.

Our invention provides further a novel method of making a flower pot of the kind described, which method may be readily employed by inexperienced persons at small expense and with materials which are readily obtainable.

The novel features of our invention are hereinafter fully described and claimed.

In the accompanying drawing which illustrates in its preferred embodiment our improved flower pot, Fig. 1 is a side elevation of the flower pot.

Fig. 2 is a top view of the same.

Fig. 3 is a vertical section on the line 3—3 of Fig. 1.

Fig. 4 is a stretchout view, reduced, of the blank from which the flower pot is formed.

Fig. 5 is a side elevation of the flower pot in which the end portions of the strip are sewed together.

Similar characters of reference designate similar parts in the different views.

1 designates the strip of pliable material from which our improved flower pot is made, and which, preferably, consists of paper impregnated with asphalt, tar, or some other preservative.

The impregnated paper strip 1 is provided with a longitudinal row of straight parallel slits 2 in and extending transversely from one longitudinal edge of the strip, thereby forming a longitudinal row of flaps 3.

The slitted strip 1 is formed into a tube, preferably a circular flaring tube, after which the end portions of the strip are overlapped and fastened together by staples 4, as shown in Figs. 1 and 2, or by sewing 5, as shown in Fig. 5.

The flaps 3, which are at the smaller end of the tube that forms the side walls of the pot, are then bent transversely inwardly diametrically at the inner ends of the slits 2, as shown in Figs. 2 and 3, in which positions adjacent ones overlap and form the bottom of the pot, which bottom is provided with a small substantially central drainage opening, as shown in Figs. 2 and 3.

As shown in Figs. 2 and 3, the slits 2 are of such lengths that the inner ends of diametrically opposite flaps 3 closely adjacent to but spaced from each other, the small drainage opening is provided. By having the slits straight and parallel, and the flaps 3 extended diametrically lengthwise, with the ends of opposite flaps spaced from each other, a strip 1 having a minimum of width is afforded, thus reducing the cost. Such relative arrangement of the slits 2 and of the flaps 3 enables the latter to close the bottom from the wall to the drainage opening above referred to.

The plant which is to be temporarily planted is then placed with the proper amount of soil in the flower pot, which is then set on the ground where it remains until it is desired to transplant the plant contained in the pot. At such time, the pot is taken with the plant in it from the ground and transported to such place as is selected for the permanent location of the plant.

Paper impregnated with asphalt, tar or other suitable preservative, is ideal as a material from which to make the flower pot, in that it is light, is easily transported, is cheap and readily obtainable by any one. It renders the paper non-absorbent, stiffens and strengthens it and prevents its decay or liability to being torn or broken easily, and it lends itself readily to the easy and quick construction of the flower pot by a person of little experience or mechanical ability.

What we claim is:—

The method of making a flower pot consisting in making a row of parallel straight slits transversely from one longitudinal edge of a strip of flexible material to form a longitudinal row of flaps, forming the strip into a tube circular in cross section, fastening together the end portions of the strip, and bending all of said flaps diametrically inwardly at the inner ends of said slits, whereby the flaps will overlap each other and form the bottom of the pot at the lower end of the wall thereof, the slits having lengths such that the inner ends of diametrically opposite flaps will be closely adjacent to but spaced from each other, thereby providing a small drainage opening through the bottom, the latter being closed by the flaps from the wall to said opening.

KENNETH HAYSLER.
ERNEST HAYSLER.